United States Patent [19]

Emmons

[11] Patent Number: 5,249,649
[45] Date of Patent: Oct. 5, 1993

[54] DISC BRAKE CALIPER OF CONTINUOUS HOOP TYPE

[76] Inventor: J. Bruce Emmons, 1711 W. Hamlin Rd., Rochester, Mich. 48309

[21] Appl. No.: 709,338

[22] Filed: Jun. 3, 1991

[51] Int. Cl.$^5$ .................................. F16D 55/00
[52] U.S. Cl. .......................... 188/73.47; 188/72.4; 188/73.31; 188/73.39; 188/370
[58] Field of Search .............. 188/72.4, 370, 153 R, 188/73.31, 73.45, 72.3, 216, 72.3, 196 P, 71.1, 72.5, 72.1, 73.47, 73.39, 153 D

[56] References Cited

U.S. PATENT DOCUMENTS

| | | |
|---|---|---|
| 2,219,792 | 10/1940 | Rasmussen et al. ............ 188/72.7 X |
| 3,051,272 | 8/1962 | Burnett ................................. 188/73 |
| 3,084,717 | 4/1963 | Purcell ................................. 138/31 |
| 3,156,325 | 11/1964 | Taylor ................................. 188/73 |
| 3,482,656 | 12/1969 | Shakespear ........................ 188/73 |
| 3,696,714 | 10/1972 | Panigati ................................ 92/170 |
| 3,887,045 | 6/1975 | DeHoff .............................. 188/73.3 |
| 3,952,840 | 4/1976 | Yamazaki et al. ......... 188/196 P X |
| 4,034,858 | 7/1977 | Rath .................................. 188/73.3 |
| 4,194,597 | 3/1980 | Evens et al. ........................ 188/73.5 |
| 4,220,224 | 9/1980 | Karasudani ........................ 188/73.3 |
| 4,222,463 | 9/1980 | Domes et al. .................. 188/216 X |
| 4,222,465 | 9/1980 | Haraikawa ........................ 188/73.5 |
| 4,306,639 | 12/1981 | Mitchell ............................. 188/370 |
| 4,331,221 | 5/1982 | Evans et al. .................. 188/73.31 X |
| 4,334,598 | 6/1982 | Portolese ...................... 188/73.31 X |
| 4,342,380 | 8/1982 | Melinat ............................... 188/71.1 |
| 4,418,799 | 12/1983 | Hart et al. ....................... 188/153 R |
| 4,458,790 | 7/1984 | Hoffman, Jr. et al. ..... 188/196 P X |
| 4,467,605 | 8/1984 | Smith ......................... 188/153 R X |
| 4,488,622 | 12/1984 | Stoka ............................. 188/216 X |
| 4,537,288 | 8/1985 | Stoka .......................... 188/196 P X |
| 4,540,068 | 9/1985 | Ritsema ........................ 188/72.3 X |
| 4,576,257 | 3/1986 | Carre et al. .................... 188/73.32 |
| 4,605,104 | 8/1986 | Thompson .................... 188/216 X |
| 4,606,439 | 8/1986 | Meynier et al. ............... 188/73.32 |
| 4,619,348 | 10/1986 | Smith ........................ 188/153 R X |
| 4,792,289 | 12/1988 | Nieratschker ...................... 417/259 |
| 4,887,696 | 12/1989 | Redenbarger et al. ......... 188/216 X |
| 5,022,500 | 6/1991 | Wang ......................... 188/73.47 X |
| 5,181,588 | 1/1993 | Emmons ........................ 188/73.31 |

FOREIGN PATENT DOCUMENTS

| | | |
|---|---|---|
| 0108680 | 5/1984 | European Pat. Off. ......... 188/73.47 |
| 2548321 | 1/1985 | France ............................... 188/72.4 |

Primary Examiner—Douglas C. Butler
Attorney, Agent, or Firm—Dykema Gossett

[57] ABSTRACT

A disc brake caliper comprises a cast body including an inboard support, an outboard support, a pair of spaced parallel bridge tension members and a central bridge compression member, with the one ends of the bridge members connected to the inboard support and their other ends connected to the outboard support. The outboard support includes a pair of transverse interconnected tension members with their outer ends connected to the bridge members and an inclined rib member extending from the central bridge member and connected to the junction of the pair of tension members. The caliper body further includes a cast cylindrical socket arranged inwardly of the bridge members and extending through the inboard support. A cylinder piston insert is retained within the socket. A piston is inserted within the cylinder and has a sleeve of elastomeric material bonded to its exterior cylindrical surface and is adapted to yieldably and sealingly engage the brake cylinder insert.

1 Claim, 3 Drawing Sheets

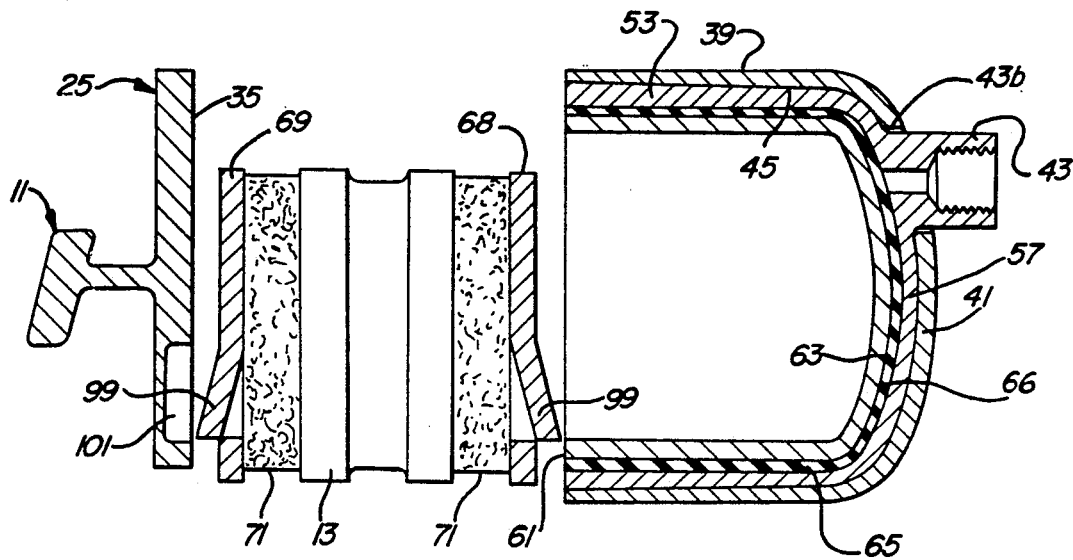
_Fig-6_
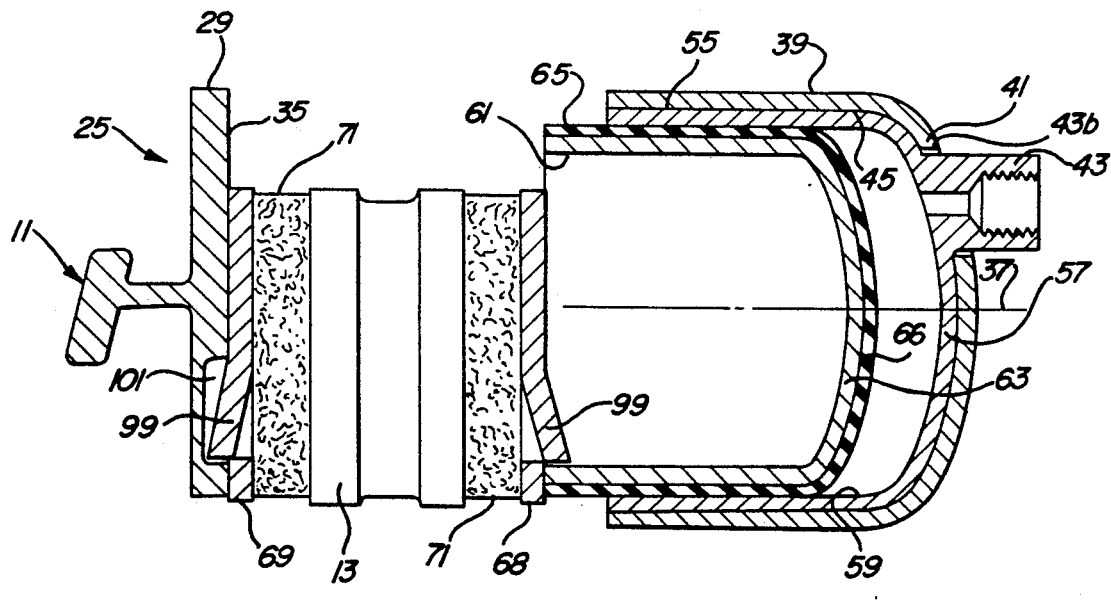
_Fig-7_

DISC BRAKE CALIPER OF CONTINUOUS HOOP TYPE

FIELD OF INVENTION

Relates to disc brakes for vehicles and more particularly to an improved disc brake caliper.

BACKGROUND OF THE INVENTION

In the design of a disc brake caliper for an automotive application, it is important to consider the effect the caliper has on the pedal feel that the driver experiences. For the best sense of control, and minimum reaction times, the pedal should have a firm feel, with a minimum of free travel before engagement. The structural stiffness of the caliper is the primary contributor to the firmness of the pedal, and should be made as high as possible within a reasonable mass. A limitation to the structural efficiency of current caliper designs is the need to machine the cylinder bore. This operation requires a large access notch in the outboard side of the caliper, causing a structural discontinuity.

Free travel results largely from the need to retract the brake pads slightly from the surface of the brake rotor to minimize the drag of the brakes when they are not being applied. A small but consistent value for the amount of retraction is desired. The retraction function is typically performed in disc brake calipers by the elastomeric seal between the piston and the cylinder bore. Most current designs use an o-ring of square cross-section located in a groove machined into the inside wall of the cylinder bore. The extension of the piston due to the application of hydraulic pressure, causes the seal to be deformed in shear by the friction forces at the surface of the piston. When the hydraulic pressure is released, the piston is drawn back slightly by the elastic stresses stored in the seal. One disadvantage of this approach is that the retraction force produced by the seal must overcome the somewhat variable friction forces between the cylinder bore and the close fitting piston. Variability is created by normal manufacturing tolerances for the piston and cylinder bore, cocking of the piston due to caliper deflection and uneven brake pad wear, corrosion or dirt between the piston and bore, thermal expansion of the piston, and the shape and dimensions of the o-ring groove. This variability can be controlled to some degree by tightening the manufacturing tolerances on the various components, but this adds cost.

THE PRIOR ART

Illustrations of prior art disclosures of disc brake calipers are set forth in one or more of the following United States patents.

| Inventor | U.S. Pat. No. | Title/Date |
| --- | --- | --- |
| R. T. Burnett | 3,051,272 | Improvement for Disk Brake Structure; August 28, 1962 |
| W. R. Taylor | 3,156,325 | Spot-Type Disc Brakes; November 10, 1964 |
| H. Shakespear | 3,482,656 | Disc Brake Caliper Body; December 9, 1969 |
| DeHoff, et al. | 3,887,045 | Disc Brake Caliper Assembly and Method; June 3, 1975 |
| Rath | 4,034,858 | Support Structure for Disc Brake Caliper; July 12, 1977 |
| Karasudani | 4,220,224 | Disc Brake; September 2, 1980 |
| Evans, et al. | 4,194,597 | Disc Brake Anti-Rattle Means; March 25, 1980 |
| Haraikawa, et al. | 4,222,465 | Disc Brake Friction Pad Retaining Structure; September 16, 1980 |
| Melinat | 4,342,380 | Light Weight Disc Brake Caliper; August 3, 1982 |
| Carre, et al. | 4,576,257 | Disc Brake with Removable Caliper Reinforcing Arm; March 13, 1986 |
| Meynier, et al. | 4,606,439 | Disc Brake; August 19, 1986 |

Examples of cylinders with flexible walls are found in the following United States patents:

| Inventor | U.S. Pat. No. | Title/Date |
| --- | --- | --- |
| H. M. Purcell | 3,084,717 | Piston Type Accumulator with Flexible Cylinder Wall; April 9, 1963 |
| Panigati | 3,696,714 | Fluid-Operated Cylinder; October 10, 1972 |
| Nieratschker | 4,792,289 | Reciprocating Pump for Cryogenic Fluids; December 20, 1988 |

SUMMARY OF THE INVENTION

An important feature of the present invention is to provide an improved disc brake caliper which eliminates and overcomes most if not all of the foregoing difficulties found in the prior art calipers.

One feature is the provision of a novel caliper including the structure and design of the casting, the piston and seal arrangement and the method of manufacture of the caliper. Another feature is to increase the stiffness and reduce the weight of the caliper, to reduce the manufacturing costs, and to reduce the initial investment in tooling and equipment.

It is another feature to provide a cylindrical socket as an integral part of the cast caliper that does not require machining; and therefore, does not require the conventional access opening previously required for such machining. In the place of machining there is assembled and retained within the cast socket a cylinder insert which is machined before assembly.

The use of a separately machined insert allows for a more efficient "truss" type of structure for the caliper body. Typically caliper structures are either of the "fist" type or the "chordal" type. The fist type is basically a wide c-clamp that depends on the considerable thickness of the bridge section for bending stiffness. The chordal type uses a flat stamped steel frame which lies in a plane described by the axis of the cylinder and a chord of the brake rotor. The cylinder is usually a separate casting to allow for machining of the bore.

The novel truss type caliper structure offers a reduction in both mass and bulk over the traditional types. The main structural member is a continuous hoop surrounding the caliper and acting primarily in tension. The use of a third, central bridge member, acting primarily in compression, allows the tension hoop to deviate from a chordal plane, thus saving bulk. Inboard and outboard compression members oppose the lateral forces in the tension members and maintain the spacing between the bridge members. The three bridge members act primarily in tension or compression as opposed to bending as in the first type caliper, and therefore can be of thinner section. This allows the largest possible rotor diameter to be used inside a given size wheel rim.

It is typical practice for a brake caliper piston to maintain a close tolerance fit between the piston and cylinder bore and to use an O-ring type seal, usually square in cross section, nested in a groove formed within the cylinder. The present invention includes the important feature of employing a rubber or elastomeric sleeve which is molded or bonded onto the piston for a yieldable seal with the cylinder.

Another feature includes upon said sleeve, a plurality of spaced circumferential ribs which yieldably engage the cylinder bore forming a multi-staged seal therebetween.

This arrangement has a number of advantages:

The sleeve undergoes an elastic shear deformation as the piston extends under hydraulic pressure. When the pressure is released, the sleeve resiliently pulls the piston back to minimize brake drag. There are no sliding parts to create friction which might interfere with this action. The piston floats in a layer of rubber or other elastomeric material. All metal contact is eliminated. This accommodates for misalignment and thermal expansion, minimizes friction and binding and there is no need for a protective rubber boot or bellows.

As another feature the present caliper responds to and compensates for uneven wear of the brake pads and rotor.

A further feature is to take advantage of the near net shape and thin wall capabilities of the vacuum assisted casting process or related process that is employed. Because of the relative precision of this casting process and the seal innovations, machining is limited to the cylinder insert.

It is an important feature in addition to the usual cope and drag (the top and bottom halves of the sand mold) there is employed a single sand core to form the cylindrical socket and the inside surface of the cross beams of the outboard support. This provides for good control over the perpendicularity between the cylinder axis and the outboard brake mounting surface.

These and other features and objects will be seen from the following specification and claims in conjunction with the appended drawings.

THE DRAWINGS

FIG. 6 is a fragmentary longitudinal section of the disassembled caliper, cylinder insert, brake pads and rotor, showing the piston in the fully retracted position.

FIG. 7 is a similar view with the parts assembled.

It will be understood that the above drawings are merely illustrative of a preferred embodiment of the invention and that other embodiments are contemplated within the scope of the claims hereafter set forth.

DETAILED DESCRIPTION OF AN EMBODIMENT OF THE INVENTION

Figure 1:
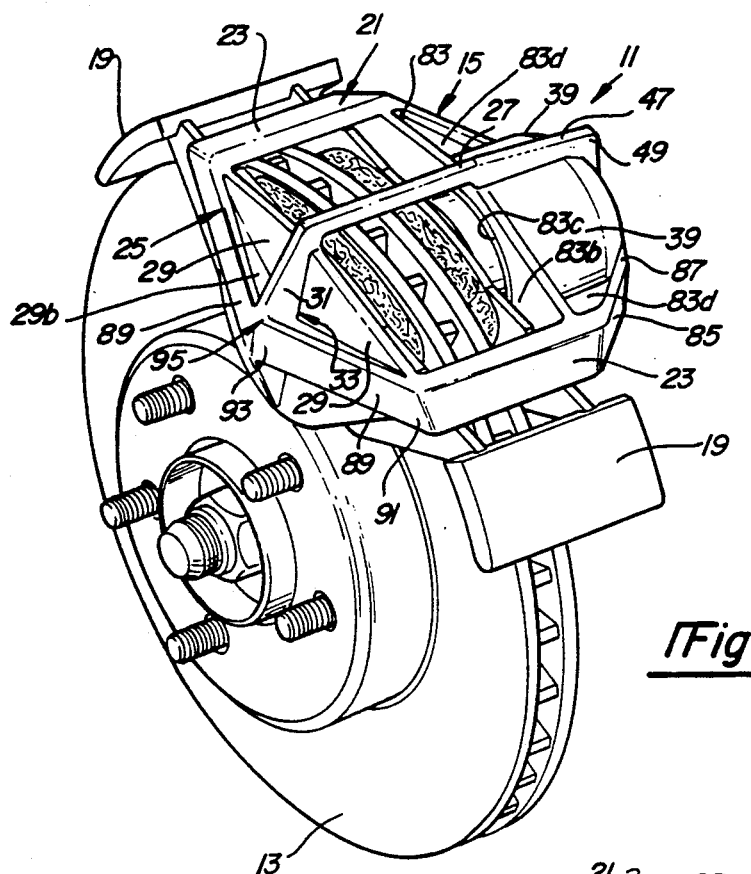
FIG. 1 is a front perspective view of the present disc brake caliper arranged in a use position with respect the brake rotor of a vehicle.
Figure 2:
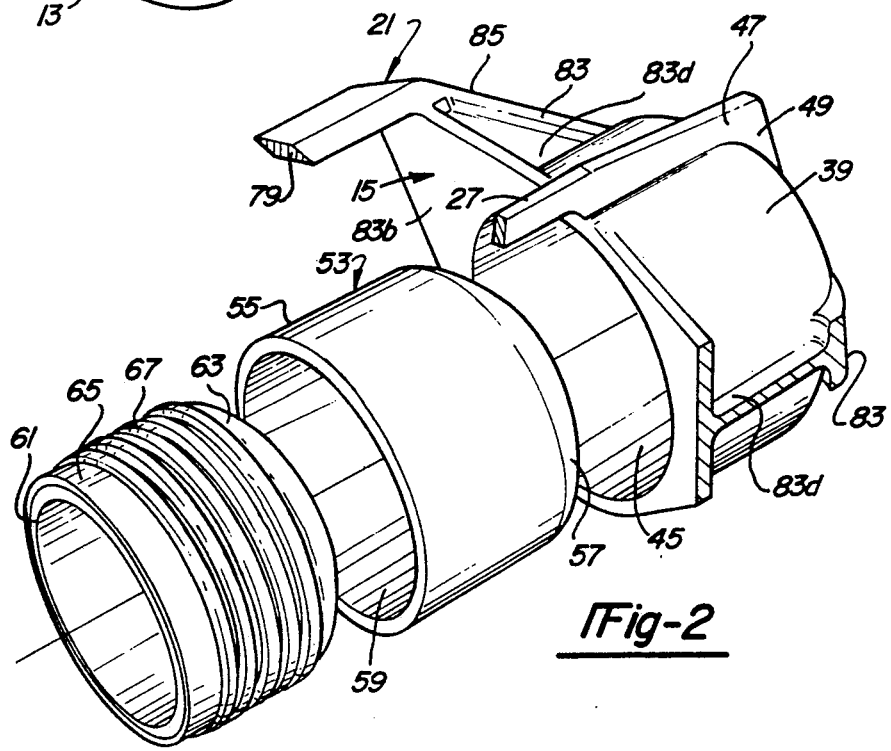
FIG. 2 is a fragmentary exploded front perspective view of the brake caliper, cylinder insert and piston.

The present disc brake caliper as a cast unit preferably of steel, is generally illustrated at 11, FIGS. 1 and 2 and shown in its position of use with respect to the wheel disc or brake rotor 13 for a vehicle in FIG. 1.

Figure 4:
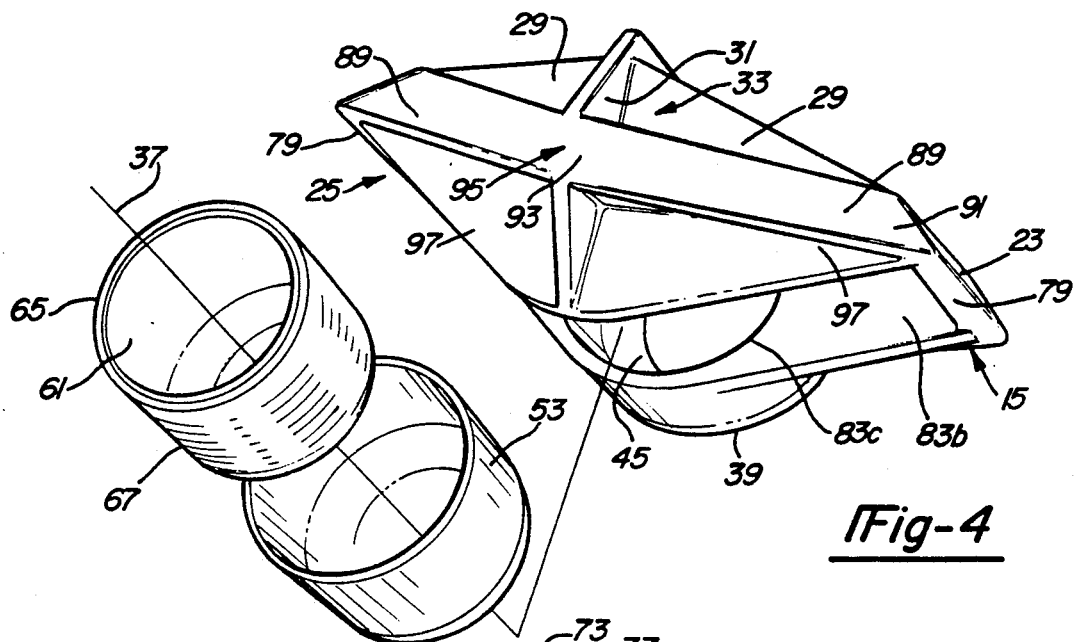
FIG. 4 is a front perspective exploded view of the brake caliper, cylinder insert and piston of FIG. 2.
Figure 5:
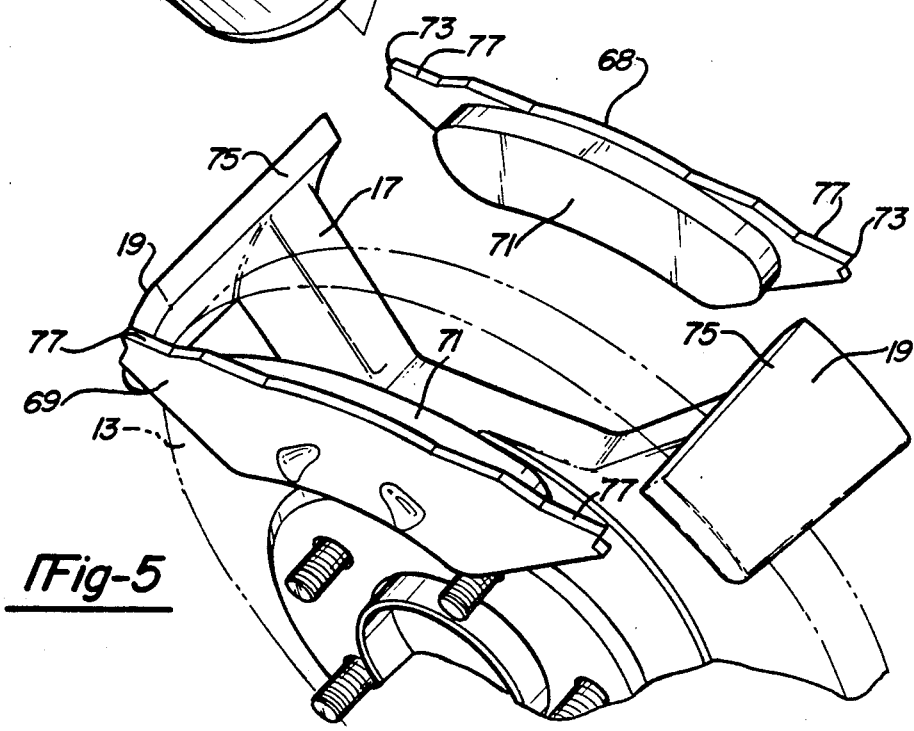
FIG. 5 is a fragmentary exploded perspective view of the brake pads, and their mounting upon a vehicle steering knuckle, with respect to a brake rotor shown in phantom.

The unit cast brake caliper, FIGS. 1 and 4, is indirectly supported upon the conventional steering knuckle 17, FIG. 5. Said steering knuckle includes a pair of laterally extending arms 19 which generally overlie the rotor 13 and are of a conventional nature. Though not shown, the assembly is similar to that shown in U.S. Pat. No. 4,194,597.

The present caliper 11 includes a unit caliper body 21, FIG. 1, including inboard support 15. A pair of longitudinally spaced parallel bridge members 23, acting primarily in tension, at their one ends are connected to outer end portions of the inboard support 15. Bridge members 23 at their other or second ends are connected to the outboard support 25.

A central bridge member 27, acting primarily in compression, at its one end is connected to a central portion of inboard support 15. Its other or second end is connected to the outboard support 25. Said outboard support is spaced from inboard support 15 and is fixedly connected at the second ends of the bridge members 23 and 27.

The outboard support 25 is a trusslike structure which includes a pair of angled tension members 89, connected together at their inner ends and having outer ends connected to the outboard ends of the bridge members 23, FIG. 1. The outboard support further includes a roughly diamond shaped flat plate 29, which acts primarily in compression in opposition to the tension in members 89. Between each of members 89 and the flat plate 29, there is a triangular shear web 29b, which serves to distribute the brake application loads more uniformly to the brake pads. The outboard support further includes a rib 31 perpendicular to the flat plate 29, which connects the second end of the central bridge member 27 to the junction of tension members 89. Said rib extends below the tension members 89 to support and stiffen the flat plate 29. The inboard side of the flat plate 29 forms an upright surface shown at 35, FIG. 7, which is planar and normally lies perpendicular to the longitudinal axis 37 of the unit cast cylindrical socket 39. This surface 35 forms the supporting surface for the outboard conventional backing plate 69.

The inboard support 15 is analogous to the outboard support 25, except that a cylindrical socket 39 is integrally cast within the trusslike structure.

The socket 39 has a closed end or end wall 41 which is circular and generally convex. It includes two spaced apertures 43b one of which is shown, through which project threaded bosses 43 on cylinder insert 53. These bosses are for conventional pressure and air bleed fittings. The cylindrical socket has a cast outwardly tapered bore 45 arranged upon the longitudinal axis 37, FIG. 7. Said axis is arranged centrally of socket 39 and extends at right angles to a plane passing through the interior wall 35 of outboard support 25.

Said inboard support 15 includes a pair of angled tension members 83 having first ends 85 and second ends 87. Said first ends 85 are connected to the inboard ends of tension bridge members 23. Said second ends are connected together and to and around the closed end 41 of socket 39 in FIG. 1. The inboard support further includes a roughly diamond shaped flat plate 83b having a large circular aperture 83c at its center for the integrally cast cylindrical socket 39. The flat plate 83b acts primarily in compression in opposition to the tension members 83. Between each of the tension members 83 and the flat plate 83b there is a triangular shear web 83d. The inboard support further includes a central rib 47 extending along the top side of the cylindrical socket 39 in a plane aligned with the axis of the cylinder. Said rib further extends over the socket end wall 41 as at 49 and is connected to the socket along its entire length. Said rib is connected at one end to the inboard end of central bridge member 27, and at the other end to the juncture of tension members 83.

Taken as a whole, the tension bridge members 23, the inboard tension members 83, and the outboard tension members 89, form a continuous hoop surrounding the periphery of the caliper. The inboard flat plate 83b and the outboard flat plate 29 act in compression to maintain the lateral separation of the tension bridge members 23. The central bridge member 27 acts primarily in compression to stabilize the out of plane force components of the tension members. This type of structure, particularly the outboard support 25, would not be possible in a unit casting if machining of the cylinder bore was required.

The present caliper is designed to take advantage of the near net shape and thin wall capabilities of the vacuum assist casting process employed. Other casting processes may also be used. Because of the relative precision of this casting process and the seal innovations, little or no machining is necessary in the manufacture of this caliper and particularly the bore 45 of socket 39.

In addition to the usual cope and drag i.e. top and bottom halves of the sand mold, a single core is used to form the socket bore 45 including its end wall 41 and the inside surface portions 35 of the outboard flat plate 29. This allows good control over the perpendicularity between longitudinal axis 37 of socket 39 and the outboard brake pad mounting surface 35, FIG. 7.

The cylinder insert 53, FIGS. 4, 6, and 7, is formed or cast of stainless steel, for illustration. Its outer wall has an outwardly diverging tapered surface 55 towards its open end which matches and snugly fits into and is retained within the tapered bore 45 of socket 39.

Said cylinder insert includes a generally convex rear wall 57. When said insert 53 is assembled into socket 39, cylinder rear wall 57 is in registry with the rear wall 41 of said socket, FIG. 6. Said cylinder insert has a cylindrical machined bore 59. Piston 61 is of cylindrical shape and includes a convex end wall 63 of the same shape as cylinder end wall 57 for registry therewith, FIG. 6. Bonded or molded over piston 61 is a sleeve 65 of an elastomeric material, such as rubber or plastic. Said sleeve includes a back wall 66 which is cemented on bonded to and extends over rear wall 63 of piston 61.

Figure 3:
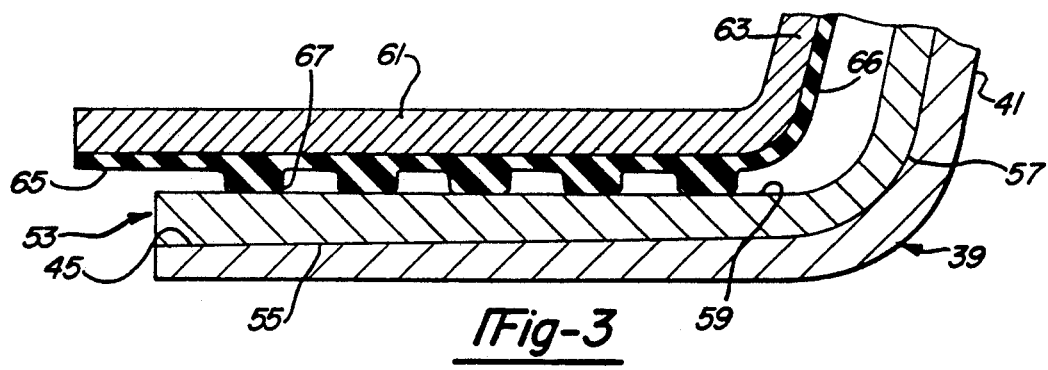
FIG. 3 is a fragmentary longitudinal section of the cylinder insert and piston, on an increased scale.

Sleeve 65 includes a plurality of spaced circumferential ribs 67 molded therein or alternately a plurality of annular undulations, FIGS. 2 and 3. The piston and sleeve, oversized relative to cylinder bore 59, is then pressed into the cylinder 53 partly deforming the ribs 67, FIG. 3. There is thus established a yielding relation between sleeve 65 and cylinder bore 59 so that piston 61 yieldably floats within cylinder 53. Actually, except in the initial setup, FIGS. 6 and 7, in operation, reciprocal movement of the piston 61 with respect to the cylinder 53 is relatively small. When the cylinder and piston have been pressurized as at the port 43, FIG. 6, sleeve 65 undergoes an elastic shear deformation as the piston yieldably extends under hydraulic pressure. It is this extending limited movement which is sufficient to apply clamping force, FIG. 7, to the corresponding inboard and outboard conventional backing plates 68 and 69 which mount the corresponding friction pads 71. This results in sufficient frictional force application to opposite peripheral surface portions of the rotor 13 for application of the vehicle brakes, FIGS. 1 and 5.

The cylinder bore presents a smooth cylindrical surface 59 into which the piston 61 is projected with its sleeve 65 and circumferential ribs 67, FIG. 2, in compression. In view of the series of ribs 67, there is provided a multi-stage seal which extends longitudinally over substantially a major portion of the length of piston 61 and with respect to a corresponding length of cylinder 53. There are no sliding parts to create friction that might otherwise interfere with this action. On release of pressure from the piston, there is an automatic return positioning of the piston due to its resilient mount within the cylinder. This construction eliminates metal to metal contact and accommodates any misalignment or thermal expansion and minimizes friction and/or any binding. There is no need for a protective rubber boot or bellows.

Referring to FIGS. 6 and 7, the inboard conventional backing plate 68 mounts the friction brake pad 71 in a conventional manner upon one side of rotor 13. The inboard backing plate has a pair of notched supports 73 at its opposite ends. These cooperatively overlie the transverse tracks 75 upon the opposed arms 19 in a conventional manner, FIG. 5. This construction, to some extent, is shown in the above U.S. Pat. No. 4,194,597.

At opposite ends of the backing plate 68, and likewise the backing plate 69 shown in FIG. 5, there are a pair of hold down faces 77 which are engaged by undersurface portions 79 of beam members 23.

The outboard backing plate 69 is of a similar construction to backing plate 68 and mounts a corresponding friction brake pad 71 to operably engage the opposite side of disc 13.

The respective inboard and outboard backing plates 68 and 69, in a conventional manner are supportably and slidably mounted upon the respective tracks 75 of the arms 19 in a manner shown in U.S. Pat. No. 4,194,597, and not actually a part of the present invention.

FIGS. 6 and 7 illustrate the method of retention of the caliper relative to the backing plates 68 and 69 and connected brake pads 71. A pair of opposed projections 99 one of which is shown, are punched out of each of the two steel brake pad backing plates 68 and 69. During the assembly of the caliper 11, piston 61 is fully retracted, FIG. 6. This allows the caliper to slip over the stack up of the rotor 13, the pair of brake pads 71 and connected backing plates 68 and 69, clearing the projections 99.

The cylinder 53 is then pressurized, causing the piston 61 to extend, FIG. 7. Two of the four projections 99, are engaged by the rim of the piston 61 on the inboard side.

The other two projections 99 are received within a pair of spaced recesses 101 in the caliper casting on the outboard side, one of which is shown. The caliper is then held in position relative to the brake pads 71. The pads and connected backing plates 68 and 69 are, in turn, held by the guide rails 75 on the steering knuckle 19, FIG. 5.

This method of assembly requires some additional stroke capability to be designed into the piston 61 and cylinder 53. However, it eliminates the need for additional bolts, pins or fasteners.

I claim:

1. A disc brake caliper of the type for use in combination with a rotor engageable by brake pads which receive a certain braking load, said disc brake caliper comprising:

a pair of identical bridge members which are spaced a certain distance apart;

a first diamond shaped flat plate acting in compression and connected to said pair of identical bridge members;

a first pair of identical tension members being mutually connected at a respective first end thereof and each of said first pair of identical tension members further having a respective second end thereof which is connected to a unique one of said pair of identical bridge members;

triangular shear web member means connected to each of said first pair of identical tension members and to said first diamond shaped flat plate for increasing the uniformity at which the braking load is applied to said brake pads;

socket means for receiving a cylinder;

a central bridge member having a first end connected to said socket means and a second end forming a rib which is connected to said first pair of identical tension members and which extends below said first pair of identical tension members effective to support said first diamond shaped flat plate;

a second pair of identical tension members, each having a first respective end thereof which is connected to a unique one of said pair of identical bridge members and a second respective end connected to said socket means, said second pair of identical tension members cooperating with said pair of identical bridge members and with said first pair of identical tension members to form a continuous hoop surrounding the periphery of said disc brake caliper; and a second diamond shaped flat plate acting in compression and connected to said second pair of identical tension members, said second diamond shaped flat plate cooperating with said first diamond shaped flat plate to maintain a spacing between said pair of identical bridge members.

* * * * *